Sept. 30, 1969  J. G. MAREK ET AL  3,469,908
REPRODUCING APPARATUS

Filed Jan. 27, 1967  2 Sheets-Sheet 1

INVENTOR
JOSEPH G. MAREK
VINCENT A. ERATO

BY Fishman & Van Kirk
ATTORNEYS

Sept. 30, 1969

J. G. MAREK ET AL 3,469,908

REPRODUCING APPARATUS

Filed Jan. 27, 1967

United States Patent Office 3,469,908
Patented Sept. 30, 1969

3,469,908
REPRODUCING APPARATUS
Joseph G. Marek, Higganum, and Vincent A. Erato, Saybrook, Conn., assignors to Victor Tool and Manufacturing, Incorporated, Chester, Conn., a corporation of Connecticut
Filed Jan. 27, 1967, Ser. No. 612,140
Int. Cl. G03g *13/00, 15/00*
U.S. Cl. 355—3         12 Claims

ABSTRACT OF THE DISCLOSURE

Apparatus for copying documents by a wet, electrostatic process. The apparatus is characterized by an optical system; including adjustable mirrors and a fixed position, wide angle lens, having a short focal length; which projects an image of the document to be copied onto a viewing screen over which travels sensitized copy paper which has just previously been passed through a corona discharge. The mirrors are easily and rapidly aligned. The viewing screen has a pattern of discrete, raised, opaque areas on the surface adjacent to the copy paper for light balancing and preventing sticking of the paper to the screen.

BACKGROUND OF THE INVENTION

Field of the invention

The present invention relates to the reproduction of documents. More particularly, the present invention is directed to apparatus for reproducing the contents of a document upon a sensitized copy sheet by means of an electrostatic image transfer process. Accordingly, the general objects of the present invention are to provide novel and improved methods and apparatus of such character.

Description of the prior art

Copying apparatus wherein a sensitized paper is charged by being passed through a corona discharge and is thereafter serially exposed to an image of the data to be copied and passed through a bath containing a toner in suspension are known in the art. However, these previous copying devices have been characterized by a plurality of inherent deficiencies. The first and most serious of these deficiencies is the problem of blurring or jamming of the sensitized copy paper. Blurring and jamming are particularly prevalent at times when the apparatus is operating in a high humidity environment. During exposure to the image of the document to be copied, the sensitized copy paper will typically pass between a pair of glass plates which direct the copy paper, hold it flat and, as will be explained in more detail below, prevent overexposure of the copy paper. When the glass plates and/or the sensitized copy paper become slightly damp, as may result from high humidity, or in extremely dry atmospheres, the paper has a tendency to stick to the surrface of the glass and thus the machine either becomes jammed or the image blurred due to the fact that the speed of the copy paper will be less than that of the document being copied.

Also, due in part to the desire to produce copying apparatus which is as compact as possible, the prior art systems for illuminating the document to be copied and for forming and transmitting an image of the data thereon to the sensitized copy paper inherently produce an image of the original document which is brighter at the center than at the edges. Thus, the image formed on the glass plate above which the sensitized copy paper travels will vary in intensity from the center outwardly toward the sides. This variation in intensity is not linear but rather is in accordance with a pattern determined by the construction of the optical system of the equipment. Accordingly, in order to produce copies which are of good quality and uniform contrast across their width, it is necessary to operate upon the glass plate upon which the image of the original document is focused. In the prior art, the operation on the glass plate consisted of printing or painting out a portion of the plate adjacent the leading edge, in the direction of sensitized copy paper travel, in accordance with a pattern determined by the characteristics of the apparatus such that the width of the transparent portion of the plate would vary inversely with the intensity of the image projected at any point thereon. The painting of the glass plate to achieve the light balancing was slow, inexact and did nothing to alleviate the aforementioned problem of the charged copy paper adhering to the glass surface.

As noted above, it is generally considered desirable to provide copying apparatus which is as lightweight and compact as possible. However, the desire for compactness is generally inconsistent with the usual requirement for an image forming system employing a lens having a relatively long focal length. It has been found that by using a wide angle lens having a relatively short focal length a clear image of a portion of an original document of the standard 8½ inches width or European form of 9 inches can be produced. In the prior art, due to the use of long focal length lenses, the available copying devices of the wet, electrostatic type were either of too large a size to be attractive for many uses or produced copies which were not sharp.

In regard to producing copies which are highly readable, it follows that the reproducing apparatus must be exactly adjusted so that the image arrives at the charged, sensitized copy paper precisely at an angle of 90° to the surface of the moving paper. All copy devices of the wet, electrostatic type employ at least one mirror for reflecting the image of the original to the sensitized copy paper. The mirror or mirrors must be precisely adjusted and, in the prior art, this adjustment was an extremely difficult and time consuming procedure requiring special tools and great skill.

SUMMARY OF THE INVENTION

The present invention overcomes the above discussed and other disadvantages of prior art wet, electrostatic copying machines and, in so doing, results in a compact, lightweight, portable and easily adjustable apparatus of such character.

Accordingly, it is an object of the present invention to reproduce documents.

It is another object of the present invention to provide apparatus for reproducing documents by a wet, electrostatic process.

It is also an object of the present invention to provide a wet, electrostatic copying apparatus which is more compact and more easily serviced and adjusted than previously available apparatus of such character.

It is a further object of the present invention to provide compact, wet, electrostatic copying apparatus which employs a lens having a short focal length.

It is yet another object of the present invention to provide an electrostatic copying apparatus wherein the problem of adherence of the charged copy paper to the surface of the screen upon which the image of the data to be copied is formed is obviated.

These and other objects of the present invention are realized by apparatus wherein an original document to be copied and the sensitized copy paper are stacked together and fed into the apparatus. In the apparatus the document and copy paper are directed along separate paths. The original document is exposed to a high intensity light generated by a lamp and associated novel multi-stage reflector means. The data on the illuminated portion of the original document is reflected via a system of mirrors and is focused by a lens and additional mirrors on a glass screen. Due to the novel arrangement of mirrors, copying apparatus in accordance with the present invention is able to employ a lens having short focal length. The sensitized copy paper is charged by being passed through a corona discharge and is then exposed to the image of the original document to form a latent electrostatic image on the paper. During exposure to the image, the charged paper passes over the glass screen upon which the image has been focused but is kept from making contact with the surface of the glass by a pattern of raised, opaque areas which are formed on the upper surface of the glass screen. The pattern of raised opaque areas, which may be formed by a silk screening process, also balances the light and thus the copy paper is, across its width, exposed to an image of constant intensity. The thus exposed copy paper is thereafter passed through a trough which contains a toner in a liquid suspension and the latent image thereon is developed. The copy paper is then dried and passed out of the machine.

Should the optical system of the copying apparatus of the present invention be out of adjustment, as will be indicated by blurred or distorted copies, the mirrors which reflect the image of the original document to the lens and thence to the forementioned glass screen may be individually adjusted without sophisticated tooling and without disassembly of the apparatus. The adjustment of each mirror is accomplished with reference gage blocks which are used to align and adjust the mirrors.

BRIEF DESCRIPTION OF THE DRAWING

The present invention may be better understood and its numerous advantages will become apparent to those skilled in the art by reference to the accompanying drawing wherein like reference numerals refer to like elements in the various figures and in which.

DESCRIPTION OF A PREFERRED EMBODIMENT

Figure 1:
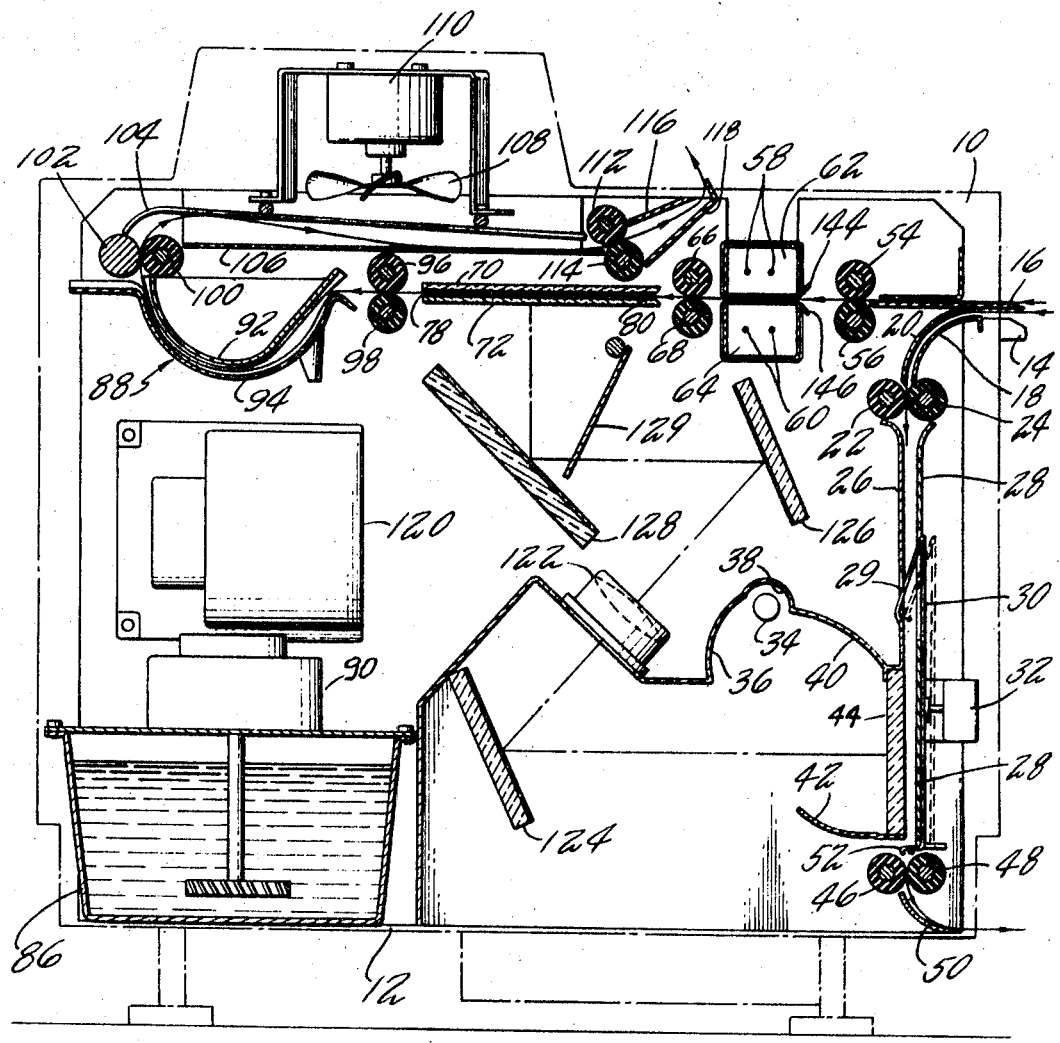
FIGURE 1 is a cross sectional, side elevation view of a preferred embodiment of the present invention.

Referring now to FIGURE 1, the disclosed embodiment of the copying apparatus of the present invention comprises an outer cabinet, not shown, which is easily removable and an inner frame comprising a pair of opposed inner sides, only one of which 10 is shown. The components which comprise the actual copying machinery of the apparatus are mounted between side inner 10 and the opposite inner side which has, in the interest of clarity, been broken away to provide a sectional view of the apparatus. It is, however, to be understood that the various machine elements shown in FIGURE 1 are either supported directly or by brackets on the opposed inner sides or are supported by cross members, such as bottom 12, extending between the sides.

Sheets of sensitized copy paper and original documents to be reproduced are fed into the apparatus in the vicinity of lip 14. Prior to being fed into the machine, the sensitized copy paper and the original document are stacked or aligned and, when inserted into the machine, a separating edge 16 above lip 14 will cause the sensitized copy paper to be fed into the machine in a horizontal direction while the original document will be directed downwardly through a channel defined by paper guide members 18 and 20. The copy and original thus move in planes which are oriented transversely to one another. At the bottom of the channel defined by members 18 and 20 the original document will be engaged by a pair of oppositely rotating rubber drive rolls 22 and 24. As the leading edge of the original document passes between drive rolls 22 and 24, the document will be engaged thereby, pulled into the apparatus and fed downward in a vertical direction through a channel defined by paper guide members 26 and 28. It is worthy of note that the drive rolls, such as rolls 22 and 24, are not molded. Rather, the drive rolls are formed by inserting rubber rollers on drive shafts by means of air pressure. This permits reuse of the rolls and/or shafts through the expedient of applying new rubber and regrinding.

As the leading edge of the original document is driven by rolls 22 and 24 downwardly through the channel defined by guide members 26 and 28 it will contact the upper end 29 of an actuating arm 30 of a microswitch 32. The leading edge of the original document will cause actuating arm 30 to move to the right, as shown in broken lines in FIGURE 1, thus closing microswitch 32. The closing of switch 32 causes current to be delivered to a high intensity light 34 which is located within a three stage parabolic reflector. This reflector is comprised of curved reflecting surfaces 36, 38, 40 and 42. It is worthy of note that paper guide member 26 and reflecting surfaces 40, 38 and 36 are formed from a single piece of sheet metal and thus the reflector also acts as a separator between inner frame side 10 and the opposing side and as a paper guide for the original document.

After passing through the channel defined by guide members 26 and 28, and after having caused actuating arm 30 to close switch 32 thus energizing high intensity lamp 34, the original document is moved past a transparent window 44 which, in the usual instance, will be glass. The side of the original document having the data thereon which is to be copied will, of course, be disposed against the outer (right) surface of window 44. As the original document moves past window 44, traveling in the downward direction, the data thereon is exposed to the light emanating from high intensity lamp 34 and focused on window 44 by reflecting surfaces 36, 38 and 40 and 42. The image of the data on the thus illuminated original document is transmitted and focused at the surface of the sensitized copy paper by a novel optical system which will be explained in greater detail below.

As the leading edge of the original document passes the lower end of the window 44, it will be engaged by a second pair of rubber drive rolls 46 and 48. Rolls 46 and 48 will cause the original document to be expelled out of the apparatus through a slot in the bottom of the front cover. The original document will be turned by a paper guide member 50 so that it leaves the machine traveling in a direction opposite to that in which it enters the machine and parallel to the surface on which the machine is resting.

It should be noted that actuating arm 30 of microswitch 32 has a second end 52 which moves with actuating arm 30. Accordingly, once switch 32 has been closed by the original document contacting actuating end 29 of arm 30, switch 32 will remain closed until the trailing edge of the original document passes end 52. Thus, only when the entire original document has been driven past window 44 will switch 32 be reopened and actuating arm 30 resume its initial position thus energizing lamp 34. The operation of lamp 34 by means of a single switch 32 constitutes an improvement over the prior art wherein a pair of interconnected switches were employed to perform the functions of turning lamp 34 on only when an original document was fed into the apparatus and insuring that the lamp would remain on until the entire length of the original document had passed the viewing window.

While the original document is being fed downwardly to the point where it will be illuminated, the sensitized copy paper will be engaged by a third pair of rubber drive rolls 54 and 56. Drive rolls 54 and 56 will move the sensitized copy paper into the apparatus in a horizontal direction and immediately into a charging field.

The charging field comprises a high electrostatic field or corona discharge. The corona discharge generating means consists of two pair of fine tungsten wires 58 and 60 suspended between oppositely disposed pairs of plastic insulators. Only one of each of the pair of plastic insulators, indicated at 62 and 64, is shown in FIGURE 1. Insulators 62 and 64 are engaged by a slot in inner frame side 10 and the like elements comprising the two oppositely disposed insulators similarly fit in a slot in the opposite side of the inner frame of the apparatus. The construction of the corona discharge forming means may be better seen from and will be more clearly understood from the description of FIGURES 5 and 6 below.

After being charged by passing through the corona discharge, the sensitized copy paper is engaged by a fourth pair of rubber drive rolls 66 and 68. Rubber drive rolls 66 and 68 direct the charged, sensitized copy paper between a pair of glass plates 70 and 72. The upper surface of plate 70, that is, the surface that does not contact the back of the sensitized copy paper, is entirely coated with a black paint. Plate 72 comprises a viewing screen. As may best be seen from FIGURE 3, the lower side of plate 72 is provided with opaque strips 74 and 76 which are located adjacent the leading and trailing edges, in the direction of copy paper travel, of the plate. Strips 74 and 76 extend substantially the length of the plate. The purpose of strips 74 and 76, which are of a length commensurate with the width of the copy paper, is to define a window of the proper width through which the sensitized, charged copy paper may be exposed to the image of the original document without danger of overexposure.

Figure 3:
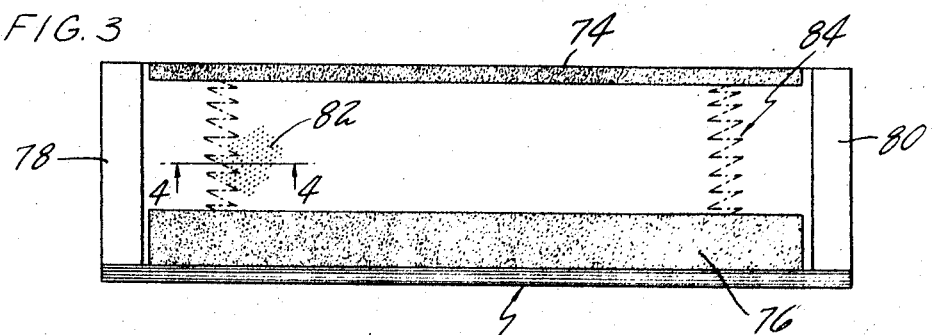
FIGURE 3 is a top view of an image transmitting screen produced in accordance with the present invention and adapted for use in the embodiment of FIGURE 1.
Figure 4:
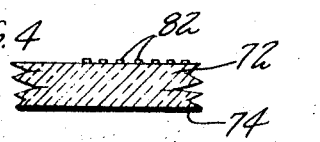
FIGURE 4 is a partial, sectional elevation view of the screen of FIGURE 3 taken along line 4—4 of FIGURE 3.

Still referring to FIGURE 3, the upper surface of plate 72 is provided, adjacent the oppositely disposed ends thereof, with strips of insulating material 78 and 80. The purpose of the strips of material 78 and 80 is to provide sufficient separation between plates 70 and 72 so that the copy paper may pass between the plates. It has been found that a double thickness of masking tape is suitable for use as separating strips 78 and 80. The upper surface of plate 72 also has a pattern of dots of black paint, indicated at 82 in FIGURES 3 and 4, thereon. Dots 82 may be applied by a process such as silk screening and are arranged in accordance with a predetermined pattern. Dots 82 serve a dual function. Firstly, they keep the sensitized copy paper raised slightly above the surface of glass plate 72 thus obviating the problem of adherence of the copy paper to the glass when either is slightly damp or in extremely dry atmospheres. As previously noted, this has been a problem of long standing in the art. Secondly, dots 82 provide for light balancing such that the resulting copies will be of constant contrast from edge to edge. In this respect, it should be noted that the pattern of dots is irregular at the edges, as indicated generally at 84, and that the pattern terminates short of the ends of opaque strips 74 and 76, which are commensurate with the width of the copy paper.

The sensitized copy paper used in the apparatus of the present invention will typically be a zinc oxide coated paper which, when charged and thereafter exposed to an image comprising light and dark portions, will have an electronic photo image formed thereon. In order to convert this latent electrostatic image to readable copy, the exposed paper must be passed through a developing solution which, in "wet" apparatus of the type to which the present invention is directed, comprises any suitable known toner in a solution; such as Toner Concentrate obtainable from Philip A. Hunt Chemical Corporation, Palisades Park, N.J., U.S.A.

Referring again to FIGURE 1, in the present invention the toner solution is stored in a reservoir 86, and, upon actuation of the machine, the toner is pumped from reservoir 86 to a trough 88 by an electrically driven centrifugal pump 90. Means, not shown, in the form of flexible tubing is employed to deliver the toner solution from reservoir 86 to trough 88 and to return the solution from the trough to the reservoir upon deenergization of pump 90. It is worthy of note that reservoir 86 is a completely sealed unit and that the toner solution will be delivered to and will remain in trough 88 only when copies are actually being made. When the apparatus of the present invention is shut off, the toner solution will return to reservoir 86 and thus the apparatus of the present invention may be moved from location to location without danger of spillage of toner solution.

Trough 88 comprises upper and lower concave trays 92 and 94 respectively. Both of trays 92 and 94 are provided with ribs which extend toward one another. The exposed copy paper is engaged by a fifth pair of rubber drive rolls 96 and 98 as it emerges from between plates 70 and 72. Drive rolls 96 and 98 feed the copy paper into the space between trays 92 and 94. This space will, of course, be filled with the toner solution and thus, as the exposed copy paper passes through trough 88, the latent electrostatic image thereon is developed by adherence of the toner in the manner known in the art. The ribs on trays 92 and 94 prevent the copy paper from sticking to the bottom or top of the channel defined by trays 92 and 94.

Upon emergence from trough 88, the developed copy paper passes between a sixth set of rolls comprised of a rubber drive roll 100 and a metal drive roll 102. Drive rolls 100 and 102 coact to keep the copy paper moving through the machine while simultaneously removing excess toner solution therefrom. In removing excess toner from the paper, rubber roll 100 functions as a squeegee. To assure squeegee action, roll 100 is ground with a crown in the middle to thereby compensate for deflection of its drive shaft. The excess toner solution will fall back into trough 88, most of it running into tray 92. Tray 92 is provided with holes in the bottom thereof such that the toner solution may return to tray 94 and thence back to reservoir 86.

As the developed copy paper emerges from between drive rolls 100 and 102, it is directed by paper guide means 104 over a drying table 106. Guide means 104 comprises a plurality of suitably shaped heavy gauge wires which direct paper as shown in FIGURE 1. As the still wet, developed copy paper passes over tray 106, it is copy side up. A fan 108 driven by motor 110 directs air against the paper as it moves over tray 106 thus drying the copy. When the dried copy reaches the end of tray 106, it is engaged by a seventh pair of rubber drive rolls 112 and 114 which direct the paper out of the apparatus through an exit slot defined by paper guide means 116 and 118. The operator of the equipment may grasp the paper as it emerges from the exit slot or the machine may be provided with a stacking fixture into which the copies will drop.

It will be noted that the apparatus of the present invention comprises 7 pairs of drive rolls which move the sensitized copy paper and the original document through the machine at the same speed. All seven pairs of drive rolls are driven by a motor 120 through suitable gearing and a chain drive, not shown. Motor 120 and pump 90 and fan motor 110 are all energized by the depression of a start button, not shown, which delivers standard 110 volt alternating current (or 220 volt European voltage) to the motors.

It has been previously noted that the present invention encompasses a novel optical system which enables the use of a wide angle lens having a short focal length. In a preferred embodiment, the focal length of the lens is 17½″. In FIGURE 1, the lens, which is stationary, is indicated at 122. The image of the original document passing in front of window 44 is reflected by a first mirror 124 to lens 122. By means of reflecting the image from mirror 124, the light path between lens 122 and the original document can be made commensurate with the focal length of the lens. The image transmitted through lens 122 is serially reflected by mirrors 126 and 128 to glass plate 72. Thus, again through the use of mirrors, the light path between the copy paper and the lens may be made commensurate with the focal length of the lens. Due to light losses within the mirrors, it has previously been deemed undesirable to employ a plurality of reflecting surfaces so as to enable the production of a compact copying machine employing a lens having a short focal length. In the present invention, such losses are minimized by applying the reflective coating to the front surface of the mirrors rather than, as is conventional practice, to the back surfaces thereof. Thus, the attenuation normally associated with the passage of light through the glass itself is eliminated. The ability to employ a lens with short focal length is also in part permitted by the fact that scattering and thus losses of light provided by lamp 34 is minimized by the novel three-stage parabolic reflector comprising reflecting surfaces 36, 38, 40 and 42 and thus a brighter image is formed. A pivotable shutter 129 can be moved to varying degrees of interference with the light path between mirrors 126 and 128 to vary the intensity of the light delivered to plate 72 to regulate the intensity of the image formed on the paper.

Figure 2:
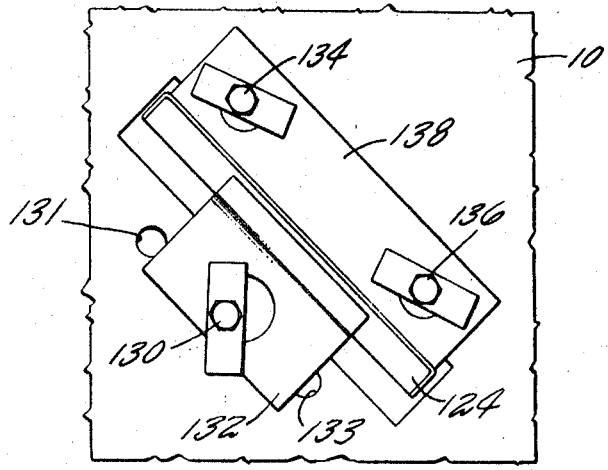
FIGURE 2 shows the means for supporting and adjusting each of the mirrors of the apparatus of FIGURE 1.

Referring now to FIGURE 2, a support means for one of mirrors 124, 126 and 128 is shown. Each of the mirrors has a support means such as that shown in FIGURE 2 mounted on the outside of each of the inner frame sides such as side 10. The mirrors extend outwardly through the sides of the frame and may be removed for cleaning or replacement merely by removing a single screw, such as screw 130, which retains the mirror bottom support bracket 132 in position. The angular position of the mirrors is easily adjustable by loosening three screws on each side of the mirror. In the case of mirror 124, as shown in FIGURE 2, screw 130 and thus support bracket 132 is loosened and screws 134 and 136 are loosened thereby permitting movement of upper mirror support bracket 138. After loosening the three screws which hold the two support brackets at each side of each mirror, the angular position of the mirror is adjustable to align and position the mirrors in accordance with the focal length of the lens in the system. A plurality of gage blocks similar to support bracket 132 are provided for each mirror in the system, the gage blocks being calibrated for various focal lengths of lens 122. In order to initially position or realign a mirror, the bracket 132 is removed and screws 134 and 136 are loosened to loosen bracket 138. A proper calibrated gage block is then selected in accordance with the mirror location and the focal length of the lens. The gage block is provided with positioning lugs which mate with holes 131 and 133 in side 10 to properly locate the gage block. The mirror, such as mirror 124 is then brought into engagement with a positioning surface on the calibrated gage block, and bracket 138 is then brought into flush engagement with the mirror and secured by tightening screws 134 and 136. In this manner the correct position for the mirror and bracket 138 are determined. The calibrated gage block is then removed and replaced by bracket 132 which is positioned to engage the mirror in the position established by the gage block and retained by securing bracket 138.

This simple and sure method and apparatus for initially aligning or realigning the mirrors provides the capacity to position the mirrors in only a few minutes without any special training. Heretofore, mirror alignment was a task consuming several hours and requiring the services of a skilled technician.

Figure 5:
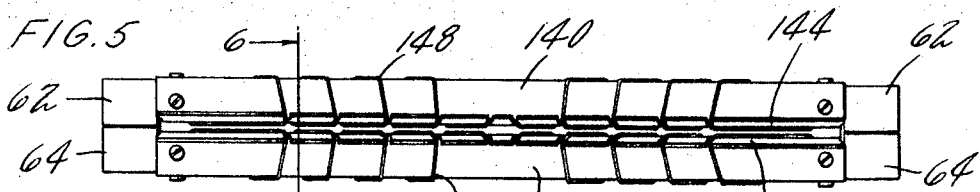
FIGURE 5 is a front view of the corona discharge establishing means of the apparatus of FIGURE 1.
Figure 6:
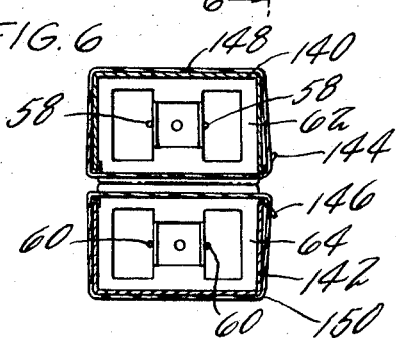
FIGURE 6 is a sectional view, taken along line 6—6 of FIGURE 5, of the apparatus of FIGURE 5.

Referring now to FIGURES 5 and 6, the means by which the sensitized copy paper is charged in the embodiment of the present invention disclosed in FIGURE 1 is shown in greater detail. The charging means comprises, as previously noted, two pair of fine tungsten wires 58—58 and 60—60 which are respectively supported at opposite sides of the apparatus by pairs of plastic insulators 62—62 and 64—64. The tungsten wires, which thus extend transversely to the direction of movement of the sensitized copy paper, have a direct current voltage in the neighborhood of 30,000 volts applied thereto from a power supply, not shown. The high voltage applied to the tungsten wires establishes, in a manner well known in the art, a high electrostatic field or corona discharge through which the copy paper passes. In passing through the electrostatic field, the copy paper will take on a negative charge which is altered by exposure to light such that, when passed through a toner solution, toner will be attracted to the paper and out of suspension in the solution in accordance with the charge on the paper.

The corona discharge establishing means also comprises a pair of metallic covers 140 and 142 which are suitably affixed to the plastic insulators and thus are insulated from the tungsten wires. Members 140 and 142 shield the discharge, provide a safety feature and, by virtue of their being turned backward and upwardly at the leading edges, as shown at 144 and 146, guide the paper into the discharge. Shield members 140 and 142 are also notched as shown and cords 148 and 150 are respectively wrapped around each of the shielding members. Cords 148 and 150 guide the copy paper through the corona discharge and thus prevent jamming in this area of the apparatus. The plastic end blocks 62 and 64 may be provided with viewing ports, not shown, at one end so that the corona discharge may be observed while the machine is in operation. In the case of difficulty, this presents a quick check as to whether or not the tungsten wires 58 and 60 are still intact. In prior art machines, verification of the existence of the corona discharge was a time consuming task which exposed the technician to a shock hazard and/or required sophisticated test equipment.

While a preferred embodiment has been shown and described, various modifications and substitutions may be made to the present invention without departing from the spirit and scope thereof. Accordingly, it is to be understood that the present invention has been described by way of illustration and not limitation.

What is claimed is:

1. In apparatus for reproducing documents; such apparatus employing sensitized copy paper and having means therein for imparting an electrostatic charge to the copy paper and for applying a toner to the thus charged copy paper after the charge thereon has been altered by exposure to light commensurate with data on an original document; an improvement in the means for transmitting an image of data to be reproduced to the charged copy paper, said improved image transmitting means comprising:

means for illuminating at least a portion of the original document;

a lens;

means for transmitting light reflected from the illuminated original document to said lens;

exposure screen means through which the charged copy paper is exposed to light focused by said lens and having an intensity commensurate with data on the original document, said exposure screen means lying in a plane adjacent and parallel to the surface of the copy paper;

opaque means for balancing the light passed to the copy paper through said exposure screen means to assure uniform exposure intensity across the width of the copy paper, said opaque light balancing means also preventing adherence of the copy paper to the exposure screen means; and means for transmitting the image of data on the illuminated original document as focused by said lens to said exposure screen means.

2. The apparatus of claim 1 wherein said light balancing and adherence preventing means comprises:
a pattern of raised, discrete, opaque areas on the surface of said exposure screen means disposed adjacent to the sensitized surface of the copy paper.

3. The apparatus of claim 2 wherein said pattern of raised, discrete, opaque areas comprises:
dots of black paint.

4. The apparatus of claim 2 wherein said pattern of raised, discrete, opaque areas is narrower than the width of the copy paper and defines an irregularly shaped region, the discrete areas being of uniform size and being uniformly spaced within said region.

5. The apparatus of claim 1 wherein said means for transmitting light from the original document to the lens comprises a window and first reflecting means, and said means for transmitting the image from the lens to the exposure screen comprises second and third reflecting means with a light intensity varying means located between said second and third reflecting means.

6. The apparatus of claim 5 wherein said first and second reflecting means each comprise:
a mirror;
a pair of oppositely disposed mirror support brackets, said mirror support brackets each comprising a pair of adjustable members; and
means for positioning a reference block adjacent one of the adjustable members of each pair, said reference block defining an angular position of the mirror commensurate with given focal length lens.

7. The apparatus of claim 5 wherein said illuminating means comprises:
high intensity light generating means; and
a three stage parabolic reflector, light emanating from said generating means being directed toward the original document by said parabolic reflector.

8. The apparatus of claim 7 wherein said light generating means comprises:
a high intensity lamp;
switch means for causing energization of said lamp, said switch means having a pair of coacting actuating arms, said actuating arms being respectively positioned before and after, in the direction of travel of the original document, of said window.

9. The apparatus of claim 6 wherein said illuminating means comprises:
high intensity light generating means; and
a three stage parabolic reflector, light emanating from said generating means being directed toward the original document by said parabolic reflector.

10. The apparatus of claim 5 wherein said light balancing and adherence preventing means comprises:
a pattern of raised, discrete, opaque areas on the surface of said exposure screen means disposed adjacent to the sensitized surface of the copy paper.

11. The apparatus of claim 7 wherein said light balancing and adherence preventing means comprises:
a pattern of raised, discrete, opaque areas on the surface of said exposure screen means disposed adjacent to the sensitized surface of the copy paper.

12. The apparatus of claim 11 wherein said pattern of raised, discrete, opaque areas is narrower than the width of the copy paper and defines an irregularly shaped region, the discrete areas being of uniform size and being uniformly spaced within said region.

References Cited

UNITED STATES PATENTS

| | | | |
|---|---|---|---|
| 2,510,863 | 6/1950 | Buskes | 95—77.5 |
| 2,546,482 | 3/1951 | Van Der Grinten | 95—77.5 |
| 3,263,557 | 8/1966 | Cunningham et al. | 95—1.7 |
| 3,282,177 | 11/1966 | Stanton | 95—1.7 |
| 3,319,546 | 5/1967 | Magnusson | 95—1.7 |

NORTON ANSHER, Primary Examiner

DAVID B. WEBSTER, Assistant Examiner